(12) United States Patent
Monsy et al.

(10) Patent No.: US 10,781,893 B2
(45) Date of Patent: Sep. 22, 2020

(54) HYDRAULIC TENSIONING DEVICE FOR AN ENGINE

(71) Applicant: Schaeffler Technologies AG & Co. KG, Herzogenaurach (DE)

(72) Inventors: Elaine Monsy, Birmingham, MI (US); Thomas Ullein, Herzogenaurach (DE); Gregory Cowen, Windsor (CA); Narendra Anne, Farmington Hills, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 175 days.

(21) Appl. No.: 15/893,255

(22) Filed: Feb. 9, 2018

(65) Prior Publication Data

US 2019/0249757 A1 Aug. 15, 2019

(51) Int. Cl.
*F16H 7/08* (2006.01)
*F16H 57/00* (2012.01)

(52) U.S. Cl.
CPC ............... *F16H 7/08* (2013.01); *F16H 57/00* (2013.01); *F16H 2007/0812* (2013.01); *F16H 2007/0872* (2013.01); *F16H 2007/0876* (2013.01); *F16H 2007/0891* (2013.01); *F16H 2057/0056* (2013.01)

(58) Field of Classification Search
CPC ..... F16H 2007/0878; F16H 2007/0806; F16H 7/08; F16H 7/0804; F16H 2007/0859
USPC .................................................. 474/110, 111
See application file for complete search history.

(56) References Cited

U.S. PATENT DOCUMENTS

| 5,370,584 | A | * | 12/1994 | Todd | F16H 7/08 474/110 |
| 5,676,614 | A | * | 10/1997 | Inoue | F16H 7/08 474/110 |
| 5,782,625 | A | * | 7/1998 | Young | F16H 7/08 474/110 |
| 5,885,179 | A | * | 3/1999 | Lewis | F16H 7/08 474/110 |
| 5,989,139 | A | * | 11/1999 | Dusinberre, II | F16H 7/08 474/110 |
| 6,093,123 | A | * | 7/2000 | Baddaria | F01L 1/02 474/110 |
| 6,435,992 | B2 | * | 8/2002 | Wakabayashi | F16H 7/08 474/101 |
| 6,447,415 | B1 | * | 9/2002 | Hashimoto | F16H 7/08 474/109 |
| 6,482,116 | B1 | * | 11/2002 | Ullein | F16H 7/08 474/101 |
| 6,817,958 | B2 | * | 11/2004 | Kaido | F16H 7/08 403/120 |
| 6,916,264 | B2 | * | 7/2005 | Hashimoto | F16H 7/0848 474/109 |
| 7,077,772 | B2 | * | 7/2006 | Hashimoto | F16H 7/0848 474/109 |

(Continued)

*Primary Examiner* — Henry Y Liu
(74) *Attorney, Agent, or Firm* — Reid Baldwin

(57) ABSTRACT

A device for tensioning a roller chain in a chain drive system is disclosed. The device includes a floating shoe with a surface upon which the chain may slide and a housing. A tension force provided by a tension mechanism is directed from the housing to the floating shoe in an outward direction with respect to the path of the roller chain. A retention feature limits the distance the floating shoe may travel with respect to the housing.

13 Claims, 6 Drawing Sheets

(56) References Cited

U.S. PATENT DOCUMENTS

| | | | |
|---|---|---|---|
| 7,513,844 B2 * | 4/2009 | Matsushita | F16H 7/0836 |
| | | | 474/109 |
| 7,641,576 B2 * | 1/2010 | Redaelli | F16H 7/08 |
| | | | 474/109 |
| 7,794,345 B2 * | 9/2010 | Slopsema | F16H 7/0848 |
| | | | 474/109 |
| 7,918,754 B2 * | 4/2011 | Kurematsu | F16H 7/0848 |
| | | | 474/110 |
| 8,727,922 B2 * | 5/2014 | Perissinotto | F16H 7/0836 |
| | | | 474/110 |
| 9,435,408 B2 * | 9/2016 | Lindner | F01L 1/022 |
| 9,523,413 B2 * | 12/2016 | Kurematsu | F16H 7/08 |
| 2007/0021251 A1 * | 1/2007 | Redaelli | F16H 7/08 |
| | | | 474/109 |
| 2016/0252167 A1 * | 9/2016 | Guyot | F16H 7/08 |
| | | | 474/111 |

* cited by examiner

HYDRAULIC TENSIONING DEVICE FOR AN ENGINE

FIELD

The described embodiments generally relate to systems and methods for maintaining tension in a drive element for an engine. In particular, described embodiments relate to systems and methods for maintaining tension of a chain drive.

BACKGROUND

A tensioning system may be provided in a variety of machines and devices to transmit mechanical power between two components. There is a need for a tensioning device for use in engine applications that maintains a tension force in a chain drive with reduced need for user intervention and that enables simplified maintenance operations.

BRIEF SUMMARY

Devices, systems, and methods for tensioning a chain drive of an engine are disclosed. In some embodiments, a device for tensioning a chain drive of an engine includes a floating shoe having a surface for slidably receiving a chain; a housing fixedly, attached to a structural member of the engine; a mating feature on the floating shoe configured to contact the housing; a tensioning mechanism mounted in the housing, wherein the tensioning mechanism is configured to apply a tension force on the floating shoe; and a retention feature disposed on the housing configured to limit the distance between the floating shoe and the housing.

In an embodiment, a device for tensioning a chain drive of an engine includes a housing coupled to the engine; at least one protrusion disposed on the housing; a floating shoe having a chain surface for slidably contacting a chain of the chain drive, wherein the floating shoe is selectively movable relative to the housing; a retention arm extending from the floating shoe, the retention arm having a retention groove formed therein for receiving the at least one protrusion; and a tension mechanism disposed on the housing configured to provide a force on the floating shoe in the direction of the chain so as to increase a tension in the chain, wherein when the protrusion is received in the retention groove, the distance between the floating shoe and the housing is limited.

In an embodiment, a device for tensioning a chain drive of an engine includes a floating shoe having a surface for slidably receiving a chain; a housing fixedly attached to the engine; a tensioning mechanism mounted in the housing, wherein the tensioning mechanism is configured to apply a force on the floating shoe so as to increase a tension in the chain; and a retention mechanism disposed between the floating shoe and the housing, wherein the retention mechanism is configured to limit the distance between the floating shoe and the housing.

A method for tensioning a chain drive on an engine using an embodiment of the present disclosure includes providing a floating shoe having a surface for slidably receiving a chain drive; coupling the floating shoe with a housing through a mating feature disposed on the floating shoe; applying a tensioning force from the housing to the floating shoe with a tensioning mechanism disposed on the housing; and limiting the separation distance of the floating shoe from the housing with a retention feature.

BRIEF DESCRIPTION OF THE FIGURES

The accompanying drawings, which are incorporated herein and form a part of the specification, illustrate the present disclosure and, together with the description, further serve to explain the principles thereof and to enable a person skilled in the pertinent art to make and use the same.

Figure 2:
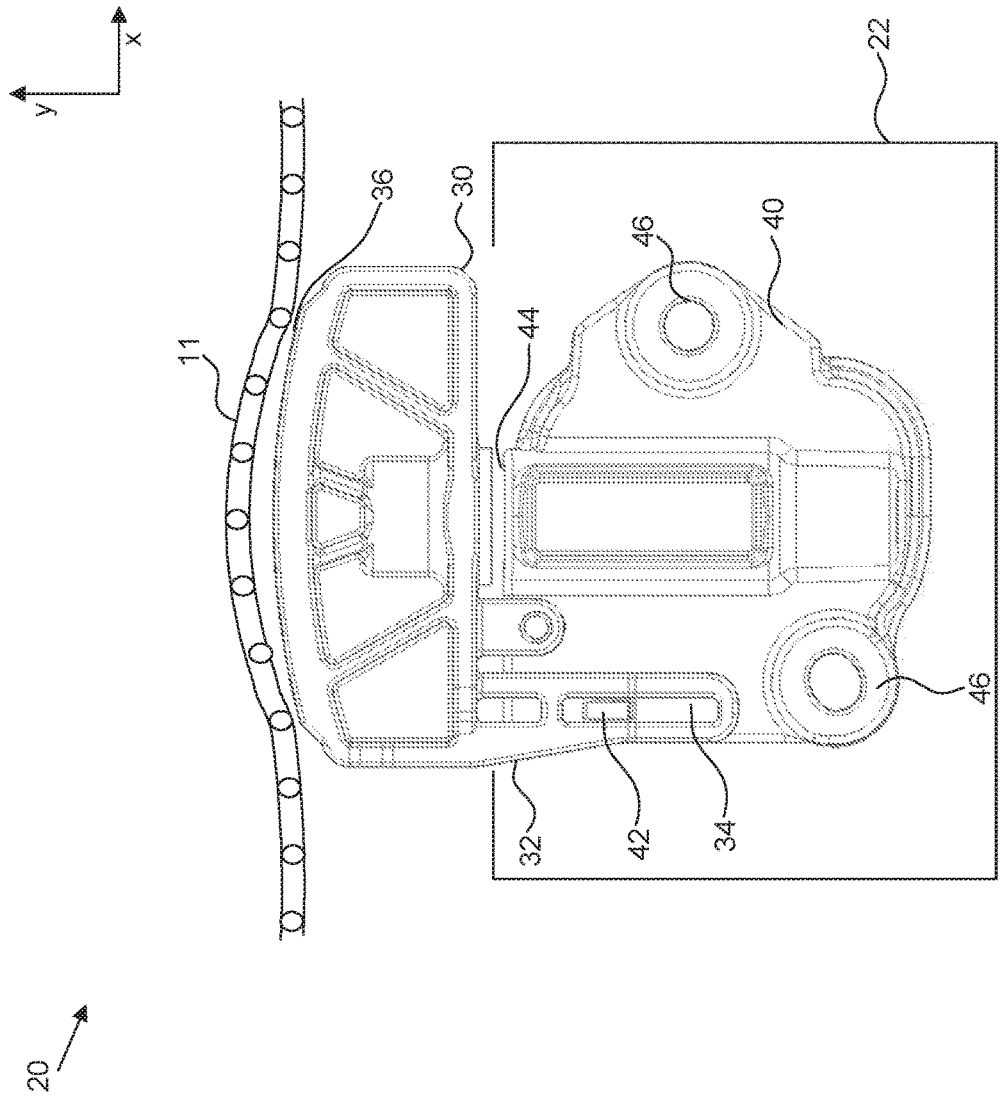
FIG. 2 is a top view of a tensioning device according to an embodiment.

FIG, 3 is a side view of a portion of a tensioning device from FIG. 2 according to an embodiment.

Figure 4:
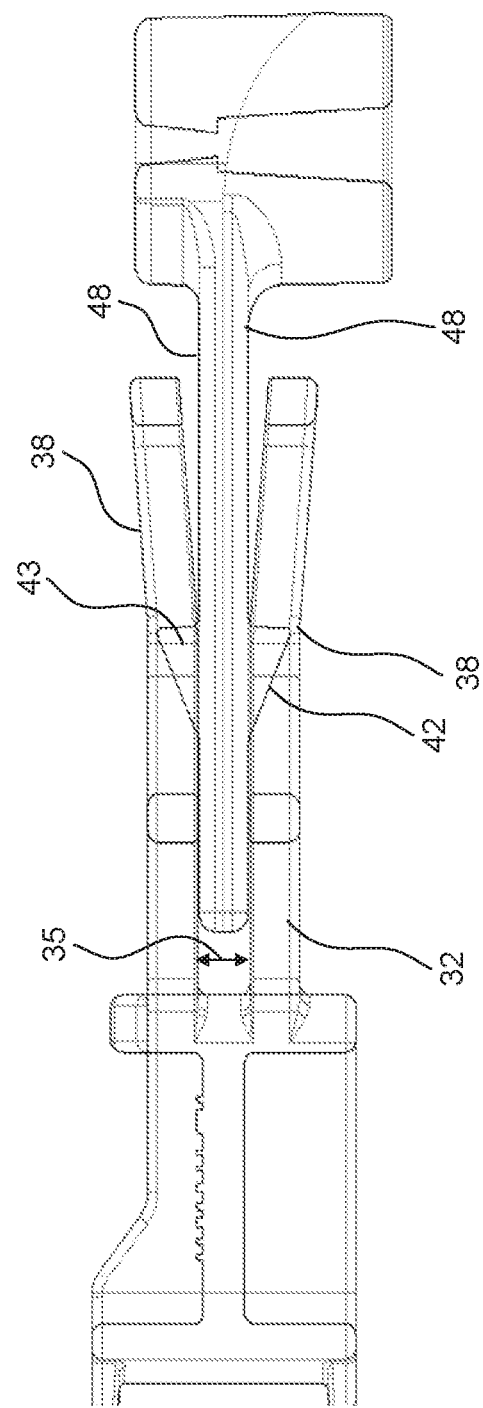

FIG. 4 is a side view of a portion of a tensioning de-vice according to an embodiment.

Figure 5:
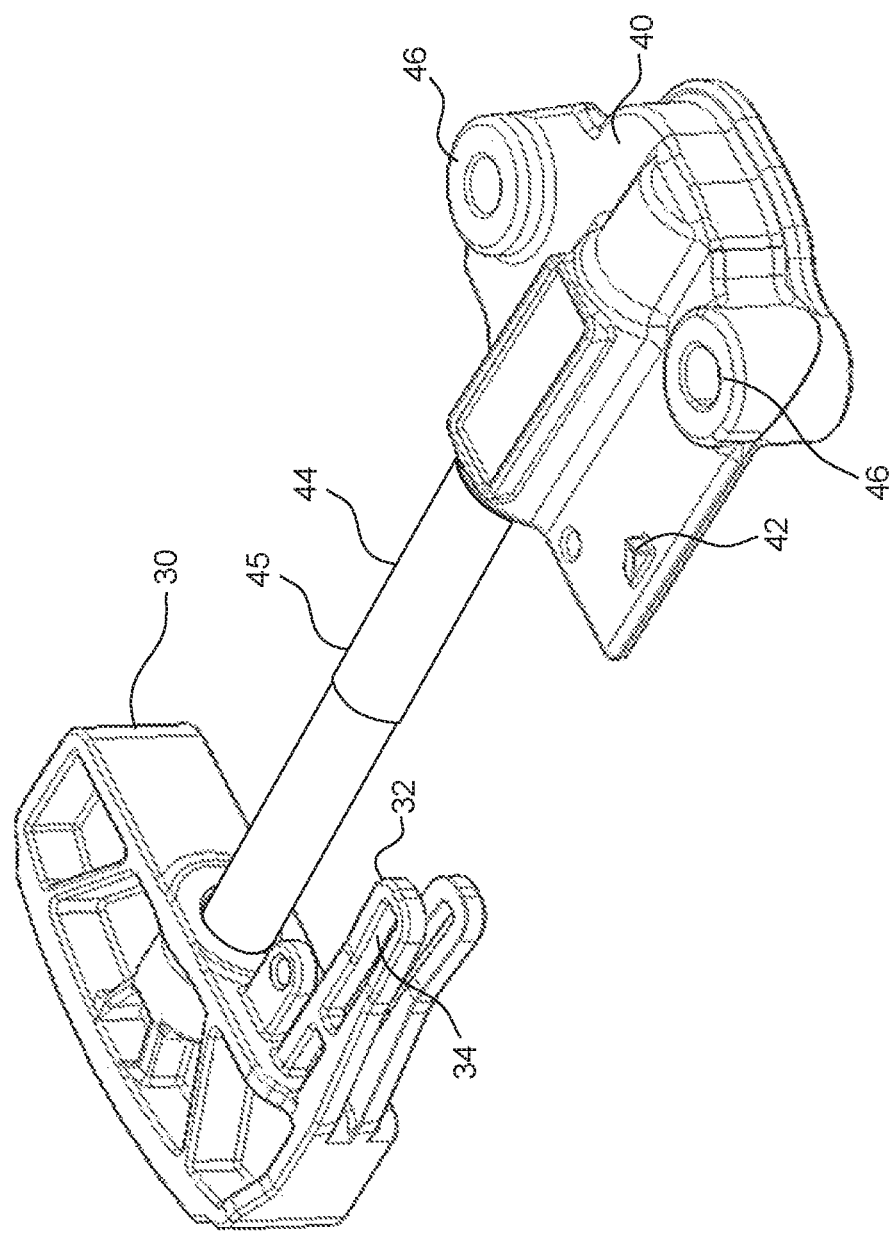

FIG. 5 is a perspective view of a portion of a tensioning device according to an embodiment.

Figure 6:
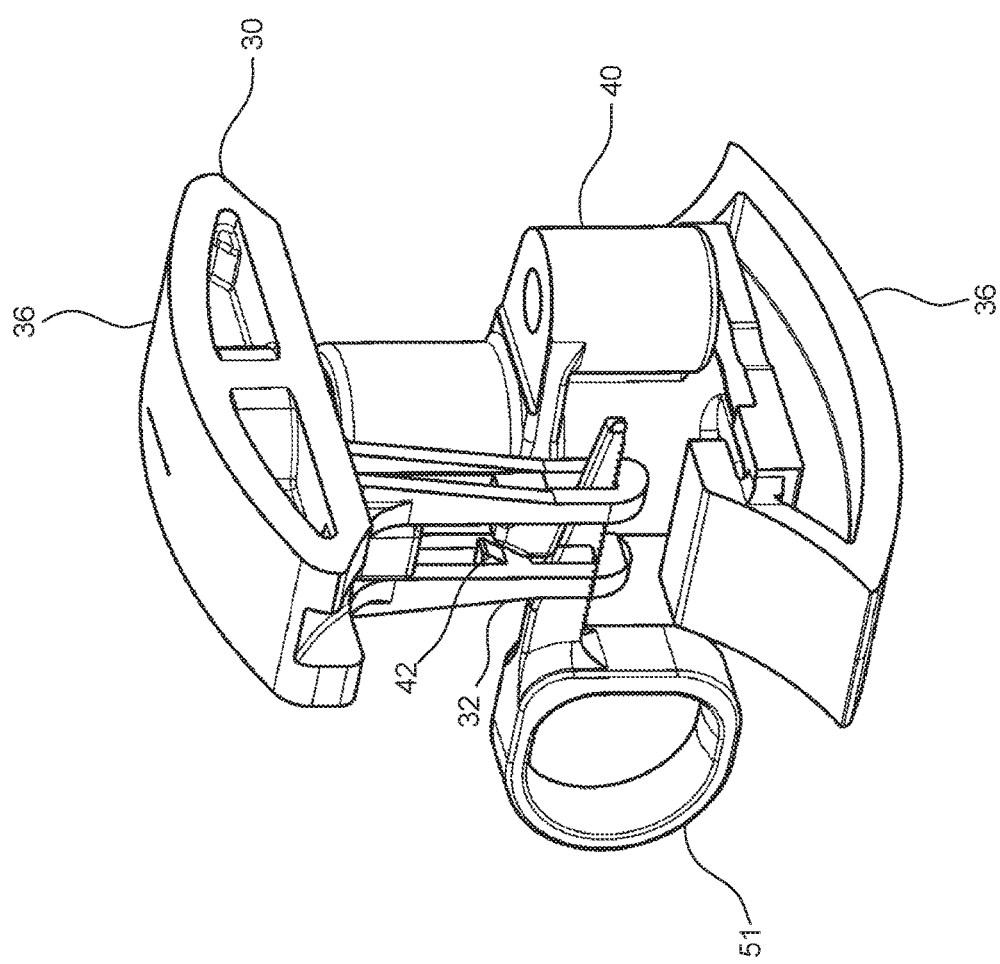

FIG. 6 is a perspective view of a tensioning device according to another embodiment.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

A drive system is used to transmit mechanical power between components of a machine or device. For example, a chain drive system comprises a roller chain that spans two or more sprockets. As will be appreciated, the sprockets may include teeth that mesh with the links of the chain. Such a system is used to transmit mechanical power between the sprockets on a variety of machines and devices. The roller chain in a chain drive system must be kept within a certain tension range in order to function properly and minimize wear.

To tension a chain in a chain drive, an additional sprocket or chain guide may be positioned along the chain path in such a way that the chain experiences a slight increase in the total length of the path it must travel. The inelastic nature of the chain means the increase in total path length will translate into an increase in tension in the chain. Ideally, the additional sprocket or chain guide is configured to be adjustable in the level of tension it provides, and to be remotely adjustable such that the tension may be kept within specific bounds without need for user intervention. In applications such as those found on an engine, a chain tensioning device according to embodiments of the present disclosure is designed to maintain appropriate chain tension and allow for ease of maintenance.

An embodiment of a tensioning device 20 for a chain drive includes a housing 40 that is fixed to a structural member 22 of an engine 10. A floating shoe 30 has a chain sliding surface 36 upon which a roller chain 11 may slide. Floating shoe 30 may comprise a housing block that is movable relative to a portion of the engine 10. A tension mechanism 44 is disposed within housing 40, and is configured to apply a tension force on floating shoe 30 directed towards roller chain 11. A mating feature 32 disposed on floating shoe 30 interfaces with a portion of housing 40 located to one side of housing 40. A retention feature 42 engages mating feature 32 to limit the minimum and/or maximum distance between floating shoe 30 and housing 40.

Figure 1:
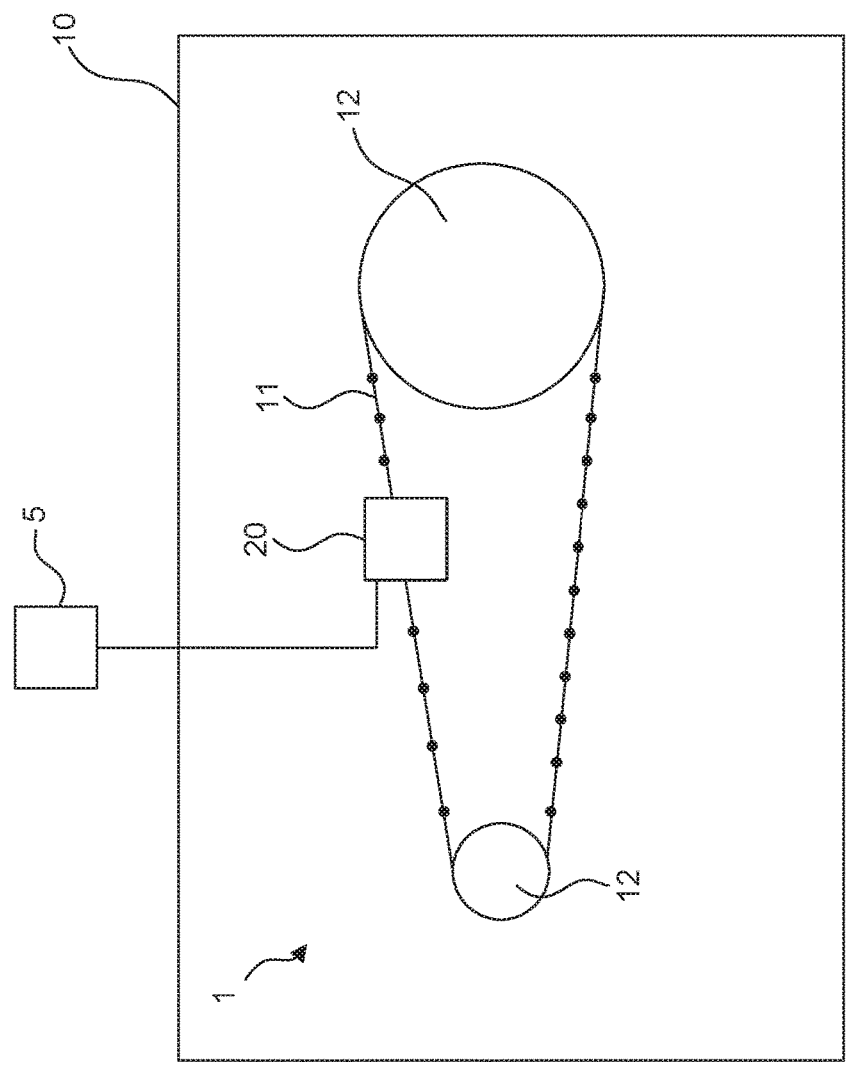
FIG. 1 is a system level diagram of a chain drive tensioning system mounted on an engine according to an embodiment.

FIG. 1 shows an example configuration of a chain drive system 1. Engine 10 is depicted in block form for purposes of illustration. Roller chain 11 travels in a continuous loop between two or more sprockets 12, which are mounted on an exterior portion of engine 10. Engine 10 may comprise an internal combustion engine such as one found in an automobile or other vehicle, an industrial engine such as one found in an industrial power generator, or any other type of machine that employs a chain drive to transmit mechanical power. In one embodiment, roller chain 11 may comprise a timing chain to drive one or more camshafts of the engine 10.

Tensioning device 20 is configured to be placed at a desired point along the chain path, where it acts to push roller chain 11 in an outward radial direction with respect to the roller chain path. In this manner, tensioning device 20 lengthens the path the roller chain 11 must travel, which, in turn, removes slack and increases tension in roller chain 11.

With reference to FIG. 2, in an embodiment, tensioning device 20 may comprise a floating shoe 30 which includes chain sliding surface 36 upon which the roller chain slides along as it travels between sprockets 12. In an embodiment, sliding surface 36 comprises an outer surface of floating shoe 30. In an embodiment, sliding surface 36 comprises an inner surface of floating shoe 30. In one embodiment, sliding surface 36 may be a toothed surface for receiving roller chain 11. Housing 40 is fixed to structural member 22 of engine 10, which may comprise an engine block, a cylinder block, or other fixed component of engine 10. Floating shoe 30 is coupled to housing 40 by mating feature 32. Floating shoe 30 retains the freedom to move in a radial direction with respect to the path of roller chain 11. In one embodiment, floating shoe 30 is also configured to move in a direction perpendicular to the path of roller chain 11 such that the height of the floating shoe 30 may be adjusted.

Tension device 20 includes a tension mechanism 44 that is fixed to housing 40 and is configured to apply a tension force on floating shoe 30 in an outward radial direction with respect to the path of roller chain 11. In one embodiment, retention feature 42 limits the minimum and maximum distance which may separate floating shoe 30 from housing 40. The tension force provided by tension mechanism 44 acts to push floating shoe 30 outward with respect to the path of roller chain 11. This lengthens the path roller chain 11 must travel because roller chain 11 is sliding along chain sliding surface 36 on floating shoe 30. Retention feature 42 acts to limit the maximum tension provided by the tensioning device 20 by limiting how far floating shoe 30 may separate from housing 40, and thus how much longer the path of roller chain 11 will become.

Figure 3:
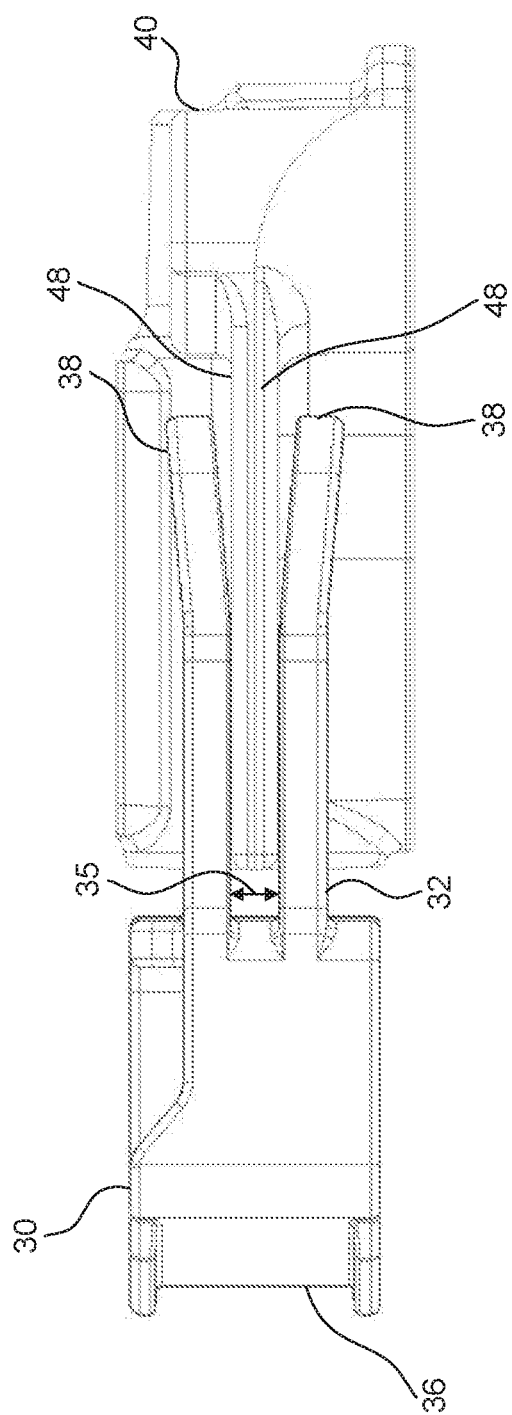

Mating feature 32 interfaces with a portion of housing 40 and acts to restrict the freedom of movement of floating shoe 30. In an embodiment, floating shoe 30 is substantially limited to movement along a radius of the path of roller chain 11 that passes through housing 40 by mating feature 32. An example of an embodiment of mating feature 32 is shown in FIG. 2-FIG. 4. In one embodiment, mating feature 32 includes a pair of symmetrical retention arms 38 that extend outwardly from the body of floating shoe 30. The retention arms 38 may comprise an upper arm and a lower arm. Retention arms 38 are positioned such that a gap 35 is defined between them that is approximately the same width as the thickness of a portion of housing 40. Retention arms 38 slide on mating surfaces 48 of housing 40 and restrict the movement of floating shoe 30 with respect of housing 40.

In an embodiment, a mating groove 34 is disposed on each of the retention arms 38. Mating groove 34 is sized to slidably mate with retention feature 42 that is disposed on one of the mating surfaces 48 of housing 40. Retention feature 42 acts to restrict mating feature 32 to movement along a line, which is configured to be parallel to a radius of the path of roller chain 11 that passes through housing 40. As best shown in FIG. 3, for example, in one embodiment, the end of one or both of retention arms 38 is angled so as to facilitate receipt of retention feature 42.

Various other configurations of mating feature 32 may also be envisioned to accomplish restriction of movement of floating shoe 30. For example, mating feature 32 may include a single arm-like protrusion from floating shoe 30, wherein the protrusion is inserted into a suitably shaped opening formed in housing 40. In this embodiment, the opening restricts the freedom of movement of mating feature 32, and includes a feature similar to retention feature 42 disposed on an inner surface of the opening into housing 40. Other variants of mating feature 32 may be similar to the symmetrical-arm embodiment described above, but may be configured to mate, for example, with a surface perpendicular to the depicted mating surfaces 48.

Housing 40 is fixed to structural member 22 of underlying engine 10 in order to act as an anchor point for the tensioning of roller chain 11. The method of fixing housing 40 must be secure enough to withstand the force that roller chain 11 may place on the tensioning device as a result of the tensioning of roller chain 11. With reference to FIG. 2, one embodiment of housing 40 is shown. A mounting feature 46 is shown on either side of housing 40. In one embodiment, mounting feature 46 is a through hole suitable for receiving a bolt to be passed through housing 40 and screwed into structural member 22. Other variations of fixing housing 40 to structural member 22 may include forming housing 40 as an integral part of structural member 22, welding housing 40 directly to structural member 22, or using appropriate high-strength adhesive to bond housing 40 to structural member 22.

Tension mechanism 44 is disposed on housing 40 and is configured to provide a tension force in the direction of floating shoe 30. Tension mechanism 44 is configured to selectively lengthen the distance between floating shoe 30 and housing 40 to apply the tension force and push floating shoe 30 outwards against roller chain 11, which runs along chain sliding surface 36 of floating shoe 30. Tension mechanism 44 may selectively lengthen the distance between floating shoe 30 and housing 40 in response to a signal received from a vehicle control unit 5.

In one embodiment, as shown, for example, in FIG. 5, tension mechanism 44 may comprise a hydraulic piston 45. The hydraulic piston 45 may be mounted in housing 40 in a suitable cylindrical housing. The hydraulic piston 45 may be fixed to housing 40 through any suitable method, including screws, adhesives, or being integrally molded into housing 40. A piston rod of the hydraulic piston 45 may be configured to connect to the floating shoe 30. The hydraulic piston can be provided with varying hydraulic pressure which corresponds to a varying tension force directed to the floating shoe 30.

In one embodiment, tension mechanism 44 comprises a coil spring that is disposed in the housing 40 and configured to apply a tension force on the floating shoe 30. The design of the coil spring may be tailored to apply an appropriate force. In another embodiment, tension mechanism 44 may be an actuator. The actuator may be housed in the housing 40 and configured to apply a tension force on the floating shoe 30.

Retention feature 42 restricts the freedom of movement of floating shoe 30 when engaged with mating feature 32 and acts to limit the minimum and maximum distance between floating shoe 30 and housing 40. Various embodiments of retention feature 42 may be used in tensioning device 20. In one embodiment, as shown, for example, in FIG. 4, mating feature 32 comprises a pair of symmetrical retention arms 38 that slidably engage with mating surfaces 48 of housing 40. Retention feature 42 comprises one or more protrusions 43 that extend outward from either of mating surfaces 48. In one embodiment, protrusions 43 comprise triangular shaped protrusions. The sloped sides of triangular protrusions 43 of retention feature 42 face towards floating shoe 30, which makes it easier for retention arms 38 of mating feature 32 to be pushed over retention feature 42. As shown, for example, in FIG, 4, retention arms 38 are configured with outwardly angled end portions to facilitate the attachment and removal of retention arms 38 over the triangular protrusions 43 of retention feature 42. When retention arms 38 are slid over retention feature 42, the triangular protrusions 43 are captured by a mating groove 34 disposed in each of the retention arms 38. The length of mating groove 34 and the design and positioning of the triangular protrusions 43 of retention feature 42 can be tailored to limit distance which floating shoe 30 may travel from housing 40. Other shaped protrusions may be used for retention feature 42, In one embodiment, retention feature 42 is located on floating shoe 30 and mating feature 32 is located on housing 40. Mating feature 32 may be configured, for example, in any of the ways described above. As an example, mating feature 32 may include a pair of retention arms 38 that extend outwards from housing 40. Retention feature 42 may then include one or more protrusions 43 located on floating shoe 30. Retention arms 38 interface with protrusions 43 as described above, and together these features limit the distance floating shoe 30 may travel.

Limiting the distance which floating shoe 30 may travel from housing 40 through retention feature 42 may provide benefits in some embodiments. For example, limiting the maximum distance limits the maximum tension the tensioning device 20 puts on roller chain 11 because the tension in roller chain 11 is proportional to how far floating shoe 30 pushes into the path of roller chain 11. Thus, malfunctions in tension mechanism 44, such as unintended spikes in hydraulic pressure in the case of a hydraulic piston being used in tension mechanism 44, will not result in excessive tension being placed on roller chain 11. Also, certain actuator types that may be used in tension mechanism 44, in particular piston-type actuators, can become damaged or fail if the actuator extends beyond a certain point and becomes subject to side-loading. Since the actuator extension in those cases is directly related to the distance of floating shoe 30 from housing 40, limiting that maximum distance prevents actuator damage. Finally, in cases where roller chain 11 is not present, such as through damage to roller chain 11 or through maintenance operations, floating shoe 30 remains attached to housing 40 and does not become lost because of the lack of force by roller chain 11 holding floating shoe 30 to housing 40.

An alternative embodiment of tensioning device 20 is shown in FIG. 6. Housing 40 includes a chain sliding surface 36 disposed on an end opposite from floating shoe 30. The tensioning device also includes an installation pin 51 which fixes the separation distance of floating shoe 30 and housing 40 at a minimum distance. Installation pin 51 remains in place while tensioning device 20 is fixed onto engine 10. The tensioning device 20 shown in FIG.6 may be designed for use with chain paths that include two closely spaced parallel lengths of roller chain 11. One leg of roller chain 11 is set to slide along chain sliding surface 36 found on housing 40, while the other leg is set to slide along chain sliding surface 36 found on floating shoe 30. When the tensioning device 20 is installed and both legs of roller chain 11 are properly positioned, installation pin 51 may be removed and tension mechanism 44 may apply a tension force to roller chain 11 as described above. This embodiment of tensioning device 20 is particularly suited for use with coil spring or similar types of actuators used in tension mechanism 44, as those types of actuators cannot typically be controlled, and thus require a solution like installation pin 51 to ease installation.

Floating shoe 30 and housing 40 may be constructed of any appropriate material that possess the necessary strength and durability to properly function as parts of a chain drive system. Examples of materials that may be used include, but are not limited to, plastics, metals such as aluminum and steel, and composite materials like fiberglass. Features disposed on either floating shoe 30 or housing 40 may also be composed of materials similar to the ones described for floating shoe 30 or housing 40. These features, such as mating feature 32 or retention feature 42, may be attached to floating shoe 30 or housing 40 in any appropriate way known to the art, including screw fastening, adhesive fastening, welding, or being integrally formed as part of the parent element.

A method of use for an embodiment of the device disclosed will now be described. First, floating shoe 30 is secured to the housing 40, which is mounted on structural member 22 of the underlying engine 10. Floating shoe 30 is secured to the housing 40 by separating retention arms 38 of mating feature 32 a sufficient distance to allow retention feature 42 to be received in mating groove 34. Generally, tension mechanism 44 will be set to apply minimal tension force at this time and the separation distance between the floating shoe 30 and housing 40 will be minimized. Roller chain 11 will then be loaded onto sprockets 12. Roller chain 11 will also be positioned to slidably contact chain sliding surface 36 of floating shoe 30. Once positioning of roller chain 11 is complete, a tension force may be applied to the floating shoe 30 by tension mechanism 44. This will have the effect of increasing the separation distance between floating shoe 30 and housing 40. The outward movement of floating shoe 30 increases the distance roller chain 11 must travel, which increases the tension in roller chain 11. The tension force will be increased until the desired tension is achieved in roller chain 11. Retention features 42 will act to limit the separation distance between floating shoe 30 and housing 40, and thus prevent any potential damage to the chain from excessive chain tension, The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

Parts List

| Part | Number |
| --- | --- |
| Chain Drive System | 1 |
| Control Unit | 5 |
| Engine | 10 |
| Roller Chain | 11 |
| Sprockets | 12 |
| Chain Drive | 13 |
| Tensioning Device | 20 |
| Structural member | 22 |
| Floating Shoe | 30 |
| Mating Feature | 32 |
| Mating Groove | 34 |
| Gap | 35 |
| Chain Sliding Surface | 36 |
| Retention Arms | 38 |
| Housing | 40 |
| Retention Feature | 42 |
| Protrusion | 43 |
| Tension Mechanism | 44 |
| Hydraulic Piston | 45 |
| Mounting Feature | 46 |
| Mating Surfaces | 48 |
| Installation pin | 51 |

What is claimed is:

1. A device for tensioning a chain drive in an engine, comprising:
   a housing coupled to the engine;
   a pair of triangular protrusions fixed to the housing;
   a floating shoe having a chain surface for contacting a chain of the chain drive, wherein the floating shoe is selectively movable relative to the housing;
   a retention arm extending from the floating shoe, configured to slidably interface with a mating surface of the housing, and having a retention groove formed therein for receiving the pair of triangular protrusions; and
   a tension mechanism disposed on the housing configured to provide a force on the floating shoe in a direction of the chain so as to increase a tension in the chain,
   wherein when the pair of triangular protrusions is received in the retention groove a distance between the floating shoe and the housing is limited.

2. The tensioning device of claim 1, wherein the triangular protrusions are configured such that a first side of each triangular protrusion is perpendicular to the mating surface of the housing, and a second side of the triangular protrusion forms an angle with the mating surface of the housing.

3. The tensioning device of claim 2, wherein the second side faces the floating shoe.

4. The tensioning device of claim 3, wherein an end of the retention arm is angled.

5. The tensioning device of claim 4, wherein the tensioning mechanism comprises a hydraulic piston.

6. The tensioning device of claim 1, wherein the retention arm comprises an upper retention arm and a lower retention arm, and wherein a gap is defined therebetween.

7. The tensioning device of claim 1, wherein the tension mechanism is configured to increase the distance between the floating shoe and the housing.

8. The tensioning device of claim 1, wherein the retention arm is integral with the floating shoe.

9. A device for tensioning a chain drive of an engine, comprising:
   a floating shoe having a surface for receiving a chain;
   a housing fixedly attached to the engine and having a first triangle-shaped protrusion with a slanted surface toward the shoe;
   a tensioning mechanism mounted in the housing, wherein the tensioning mechanism is configured to apply a force on the floating shoe so as to increase a tension in the chain; and
   a first arm extending from the shoe and defining a first slot oriented parallel to the force,
   wherein the first protrusion is received within the first slot.

10. The tensioning device of claim 9, wherein the first protrusion and first arm limit a distance between the housing and the shoe.

11. A device for tensioning a chain drive of an engine, comprising:
    a floating shoe having a surface for receiving a chain;
    a housing fixedly attached to the engine and having a first protrusion;
    a first arm extending from the shoe and defining a first slot oriented parallel to the force, wherein the first protrusion is received within the first slot; and
    a second arm extending from the shoe, the first and second arms slide along opposing mating surfaces of housing.

12. The tensioning device of claim 11, wherein the second arm defines a second slot oriented parallel to the force, wherein a second protrusion fixed to the housing is received within the second slot.

13. The tensioning device of claim 12, wherein ends of the first and second arms are angled outward relative to one another.

* * * * *